3,462,397
PROCESS FOR THE MANUFACTURE OF POLY-
β-AMIDES IN A LIQUID TWO PHASE SYSTEM
Walter Rupp, Niederhofheim, Taunus, and Claus Beermann, Neu-Isenburg, Germany, assignors to Farbwerke Hoechst Aktiengesellschaft vormals Meister Lucius & Bruning, Frankfurt am Main, Germany, a corporation of Germany
No Drawing. Filed Feb. 3, 1967, Ser. No. 618,259
Claims priority, application Germany, Mar. 2, 1966,
F 48,563
Int. Cl. C08g 20/10, 20/18
U.S. Cl. 260—78    2 Claims

ABSTRACT OF THE DISCLOSURE

Polymerization of definite β-lactams to yield fiber- and film-forming poly-β-amides of high molecular weight in a liquid, two-phase system, one phase of which essentially consists of a β-lactam solution in a halogenated aromatic solvent while the other phase essentially consists of a solution of the said halogenated aromatic solvent in heavy gasoline, the polymerization being carried out with the use of known basic catalysts and co-catalysts.

---

This invention relates to a process for the manufacture of poly-β-amides of high molecular weight from β-lactams by anionic polymerization in a two-phase system.

The anionic polymerization of β-lactams using alkaline catalysts is known. In this reaction, for example, chlorobenzene and o-dichlorobenzene are used as solvents. Non polar or low polar solvents are unsuitable, however, for a polymerization of β-lactams in homogeneous solution because the polymer separates prematurely whereby polymers are obtained having low medium molecular weights. The polymerization in homogeneous phase with strongly polar solvents, for example dimethyl sulfoxide, results in polymers having high molecular weights, but this polymerization is difficult to carry out from a technical point of view because the whole mixture solidifies after a short time to a tough, gelatinous mass which can no longer be stirred so that the dissipation of heat required in the exothermal polymerization in order to obtain high molecular weights is no longer ensured. The reaction takes an uncontrollable course and yields polymers which are very difficult to convey and work up.

It is also known to polymerize dispersions of liquid β-lactams or β-lactams liquified with solvents in inert diluents. In general, the lactam or the solution of the lactam must be insoluble in the diluent since otherwise it would be a polymerization in homogeneous phase in a solvent mixture.

Still further, it is known art that in the bead-, emulsion- and suspension-polymerizations protective colloids, emulsifiers or dispersing agents must be used to obtain unobjectionable, settling or stable dispersions or latices (cf. Houben-Weyl, Methoden der organischen Chemie, 1961, volume XIV/1, pp. 135/136, 880/881). Up to now, polymerizations of emulsions of β-lactams or of solutions of β-lactams in inert diluents have only been possible in the presence of emulsifiers and thickening agents, for without these additives the dispersions break after a short period of time, the polymers agglomerate and the apparatus becomes incrusted and useless. To attain high molecular weights it is furthermore necessary to use a strongly polar solvent, such as dimethyl sulfoxide. Moreover, it has been proposed to use certain emulsifiers for systems of β-lactam solutions in strongly polar solvents, for example dimethyl sulfoxide, dimethyl formamide, N-methylpyrrolidone, and phosphoric acid N,N′,N″-tris-dimethylamide, and inert diluents such as gasoline.

It has likewise been proposed to polymerize pyrrolidone in a gasoline dispersion with the addition of an emulsifying auxiliary.

Emulsifiers and thickening agents have the great disadvantage, however, that they deposit on the polymer grain and that they can be removed with difficulty and great expense only when the polymerization is terminated. They cannot remain in the polymer product as they would involve troubles in the substquent spinning, for example formation of incrustations in the spinning nozzles, formation of thread ends and capillary ruptures. The use of strongly polar solvents in the suspension polymerization involves further disadvantages. Strongly polar, water-soluble solvents are expensive and, therefore, they must be recovered from a large amount of water with additional expense, after a steam treatment of the polymer to eliminate the diluent.

It has now been found that definite β-lactams can advantageously be polymerized, in the absence of strongly polar solvents and without emulsifying auxiliaries and thickening agents, in a sort of suspension polymerization in a two phase system to yield products of high molecular weight.

The present invention provides a process for the manufacture of polyamides of high molecular weight from β-lactams by anionic polymerization in a two-phase system consisting of a β-lactam solution and a diluent, which comprises dissolving azetidinone-2, 4-methyl-azetidinone - 2, 4 - ethyl - azetidinone - 2, 4 - vinyl-azetidinone - 2, cis - and trans - 3, 4 - dimethyl - azetidinone - 2, or mixtures thereof in a halogenated aromatic compound, the proportion by weight of the β-lactam or the β-lactam mixture to the solvent being in the range of from 1:10 and 1:1, diluting the solution with heavy gasoline to an extent such that the proportion of diluent to β-lactam solution is near the limit at which the solution separates into its components, and carrying out the polymerization in the two-phase system obtained at a temperature in the range of from −20° C. to +50° C. with the aid of known catalysts and co-catalysts.

The monomeric β-lactams that can be polymerized by the process according to the invention have the general formula

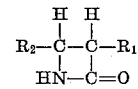

in which in the case of azetidinone-2 $R_1$ and $R_2$ stand for hydrogen, in the case of 4-methyl-azetidinone-2 $R_1$ stands for hydrogen and $R_2$ stands for methyl, in the case of 4-ethyl-azetidinone-2 $R_1$ stands for hydrogen and $R_2$ stands for ethyl, in the case of 4-vinyl-azetidinone-2 $R_1$ stands for hydrogen and $R_2$ stands for vinyl and in the case of cis- and trans-3,4-dimethyl-azetidinone $R_1$ and $R_2$ stand for methyl.

The aforesaid β-lactams can be polymerized either individually or in admixture with one another.

Halogenated aromatic compounds to be used as solvents are, for example, chlorobenzene, bromobenzene, o-dichlorobenzene, 2-, 3-, and 4-chlorotoluene. In the solutions of the β-lactams in these solvents the proportion by weight of the β-lactam or β-lactam mixture to the solvent is in the range of from 1:10 to 1:1, preferably 1:5 to 1:2.

By heavy gasoline to be used as diluent there are to be understood gasoline fractions free from aromatic compounds and boiling in the range of from 100 to 240° C., advantageously 150 to 200° C.

The polymerization is carried out at a temperature of from −20° C. to +50° C., preferably 5 to 25° C.

The solvent and the diluent can be mixed in any proportion, whereas the β-lactams are fully miscible with the solvent and miscible to a limited extent only with the diluent. The ratio of concentration of the three components should be chosen in such a manner that in a temperature range from 25° C. below to 25° C. above the respective polymerization temperature a true solution as well as an emulsion can be obtained. In the process according to the invention it is essential that an emulsion is polymerized in which the solvent is divided among the two phases and that the polymerization is carried out at a temperature at which the system separates into its components, that is to say the said emulsion is just obtained. The proportion by volume of β-lactam solution to diluent required to meet these conditions depends on the nature of the β-lactam. Examples of the necessary proportions by volume at different temperatures are given in the following Examples 1 to 3.

When the specified β-lactams or mixtures thereof are polymerized in a system of this type according to a known method in the presence of alkaline catalysts and N-acyl-lactams as co-catalysts, the polymer precipitates after some time swollen by part of the solvent and forms an excellent dispersion that can be well stirred in the true solution consisting of diluent and the remainder of solvent.

The polymer is easy to work up. It is filtered with suction and dried, if necessary after having been treated with steam. The solution of diluent and solvent recovered in the suction-filtration is pure and can be used again at once. The recovery of a strongly polar solvent from an aqueous phase is not necessary. The polymer product is entirely free from impurities, it has a high molecular weight and fibers and films can be made therefrom without difficulty.

The following azetidinones are unsuitable in the polymerization according to the invention:

(1) azetidinones carrying longer aliphatic substituents because they are fully soluble in heavy gasoline, for example 4-methyl-4-neopentyl-azetidinone-2 or 4-octyl-azetidinone-2;
(2) azetidinones which are not sufficiently soluble in halogenated aromatic compounds, for example 4-phenyl-azetidinone-2;
(3) azetidinones which meet the requirements but do not form dispersions, agglomerate in the polymerization, form incrustations and lumps, for example 4,4-dimethyl-azetidinone-2.

The following examples serve to illustrate the invention but they are not intended to limit it thereto.

EXAMPLE 1

Mixing proportions of β-lactam solutions of 25% strength by weight in chlorobenzene with heavy gasoline at the limit at which the solutions separate into their components at 10, 20 and 30° C. (proportions by volume). The petroleum fraction used had a boiling point in the range of from 180 to 205° C., a specific gravity of 0.769, a refractive index $n_D^{20}$ of 1.427, and was free from aromatic compounds.

| | β-Lactam in chlorobenzene:heavy gasoline | | |
|---|---|---|---|
| | 10° C. | 20° C. | 30° C. |
| 4-methyl-azetidinone-2 | 1:1.2 | 1:1.3 | 1:1.5 |
| 4-ethyl-azetidinone-2 | 1:6.5 | 1:>10 | 1:>10 |
| 4-vinyl-azetidinone-2 | 1:0.9 | 1:1.1 | 1:1.4 |
| 3,4-dimethyl-azetidinone-2 (55% by weight trans-, 45% by weight cis-) | 1:4 | 1:10.5 | 1:>10 |
| 70% weight 4-methyl-, 21% by weight trans-3,4-dimethyl-, 9% by weight cis-3,4-dimethyl-azetidinone-2 | 1:1.6 | 1:1.7 | 1:1.9 |
| 4,4-dimethyl-azetidinone-2 | 1:3 | 1:4.5 | 1:6 |

EXAMPLE 2

Mixing proportions of β-lactam solutions of 25% strength by weight in o-dichlorobenzene with heavy gasoline at the limit at which the solutions separate into their components at 10, 20, and 30° C. (proportions by volume). The heavy gasoline used was the same as that of Example 1.

| | β-Lactam in o-dichlorobenzene: heavy gasoline | | |
|---|---|---|---|
| | 10° C. | 20° C. | 30° C. |
| 4-methyl-azetidinone-2 | 1:1 | 1:1.2 | 1:1.4 |
| 4-ethyl-azetidinone-2 | 1:5 | 1:>10 | 1:>10 |
| 4-vinyl-azetidinone | 1:1 | 1:1.1 | 1:1.3 |
| 3,4-dimethyl-azetidinone-2 (55% by weight trans 45% by weight cis) 70% by weight 4-methyl-, 21% by weight trans 3,4-dimethyl, 9% by weight cis-3,4-dimethyl-azetidinone-2 | 1:6 | 1:9.5 | 1:>10 |
| | 1:1.5 | 1:1.65 | 1:1.85 |
| 4,4-dimethyl-azetidinone-2 | 1:4 | 1:4.5 | 1:6 |

EXAMPLE 3

Mixing proportions of β-lactam solutions of 25% strength by weight in bromobenzene with heavy gasoline at the limit at which the solutions separate into their components at 10, 20, and 30° C. (proportion by volume). The heavy gasoline used was the same as that of Example 1.

| | β-Lactam in bromobenzene: heavy gasoline | | |
|---|---|---|---|
| | 10° C. | 20° C. | 30° C. |
| 4-methyl-azetidinone-2 | 1:0.8 | 1:1.0 | 1:1.2 |
| 4-ethyl-azetidinone-2 | 1:3.3 | 1:3.8 | 1:5.0 |
| 4-vinyl-azetidinone-2 | 1:0.5 | 1:0.7 | 1:1.0 |
| 3,4-dimethyl-azetidinone-2 (55% by weight trans 45% by weight cis) 0% by weight 4-methyl-, 21% by weight trans-3,4-dimethyl-, 9% by weight cis-3,4-dimethyl-azetidinone-2 | 1:2.2 | 1:2.9 | .01 1:4.0 |
| | 1:1.1 | 1:1.2 | 1:1.4 |
| 4,4-dimethyl-azetidinone-2 | 1:2.2 | 1:2.5 | 1:3.0 |

EXAMPLE 4

A flask provided with stirrer was charged with 40 grams of 4-methyl-azetidinone-2, 80 milliliters of o-dichlorobenzene and 9 milligrams of oxalyl-pyrrolidone. 240 milliliters of heavy gasoline (boiling range 180 to 205° C.) were added and the mixture was cooled to 15° C. while slightly stirring. A solution of 0.8 gram of potassium-pyrrolidone, 1-milliliter of 4,4-dimethyl-azetidinone-2 and 40 milliliters of o-dichlorobenzene was dropped in over a period of 5 minutes while the reaction flask was thoroughly cooled with ice water. The temperature in the reaction vessel slowly rose to about 25° C. and then diminished again. The mixture was allowed to stand for 4 hours at room temperature, after which time the reaction was terminated. The dispersion obtained was well stirrable. It slowly settled without mechanical means. The product was filtered off with suction, treated with steam and dried. 38 grams of a fine-grained polymer (yield 95%) were obtained having a relative viscosity of 4.5, determined at 20° C. with a solution of 1 gram of substance in 100 milliliters of concentrated sulfuric acid.

EXAMPLE 5

70 grams of 4-ethyl-azetidinone-2, 16 milligrams of oxalylpyrrolidone, 150 milliliters of o-dichlorobenzene and 1250 milliliters of heavy gasoline boiling in the range of from 180 to 205° C. were cooled to +5° C. while stirring. Within a few minutes a solution of 1.4 grams of potassium-pyrrolidone, 2 milliliters of 4,4-dimethyl-azetidinone-2 and 50 milliliters of o-dichlorobenzene was added and the reaction temperature was maintained for 1 hour at +5° C. by thoroughly cooling. Polymerization was then terminated by allowing the mixture to stand for 3 hours at room temperature. The dispersion obtained was well stirrable and could be conveyed and filtered off with suction without difficulty. The yield amounted to 61 grams (87% of the theory), the product had a relative viscosity of 3.5, determined at 20° C. with a solution of 1 gram of substance in 100 milliliters of concentrated sulfuric acid.

EXAMPLE 6

70 grams of 4-methyl-azetidinone-2, 21 grams of trans-3,4-dimethyl-azetidinone-2, 9 grams of cis-3,4-dimethyl-azetidinone-2, 22.5 milligrams of oxalyl-pyrrolidone, 200 milliliters of o-dichlorobenzene and 700 milliliters of heavy gasoline (boiling range 180 to 205° C.) were cooled to 14° C. while stirring. A solution of 2 grams of potassium-pyrrolidone, 3 milliliters of 4,4-dimethyl-azetidinone-2 and 100 milliliters of o-dichlorobenzene was added over a period of 4 minutes. By thorough cooling care was taken that the temperature in the reaction vessel did not exceed 25° C. After a time of reaction of about 4 hours the dispersion was filtered off with suction, the product was treated with steam and dried. 92 grams of a fine-grained statistic copolymer was obtained having a relative viscosity of 3.8 determined at 20° C. with a solution of 1 gram of substance in 100 milliliters of concentrated sulfuric acid.

EXAMPLE 7

50 grams of 4-vinyl-azetidinone-2, 11 milligrams of oxalylpyrrolidone, 100 milliliters of chlorobenzene and 200 milliliters of heavy gasoline boiling in the range of from 180 to 205° C. were cooled to 15° C. while stirring. A solution of 0.8 gram of potassium-pyrrolidone, 1.5 milliliters of 4,4-dimethyl-azetidinone-2 and 50 milliliters of chlorobenzene was added over a period of 4 minutes and by thorough cooling care was taken that the temperature in the reaction vessel did not exceed 25° C. The dispersion obtained had very good properties. The yield was quantitative. The poly-$\beta$-amide which still contained all vinyl groups in a non-modified state had a relative viscosity of 6.9, determined at 20° C. with 1 gram of substance in 100 milliliters of concentrated sulfuric acid. Valuable products could be obtained from solutions in the usual polyamide solvents.

EXAMPLE 8

A mixture of 28 grams of trans-3,4-dimethyl-azetidinone-2, 12 grams of cis-3,4-dimethyl-azetidinone-2, 9 milligrams of oxalyl-pyrrolidone, 40 grams of bromobenzene and 200 milliliters of heavy gasoline boiling at a temperature in the range of from 180 to 205° C. was cooled to 15° C. while stirring. A solution of 2 grams of potassium-pyrrolidone, 3-milliliters of 4,4-dimethyl-azetidinone-2 and 40 grams of bromobenzene was added within a few minutes. In the first 30 minutes the temperature was maintained in the range of from 15 to 25° C. by thorough cooling and polymerization was then terminated by allowing the mixture to stand for 4 hours at room temperature. 37 grams of a coarse-grained product was obtained having a relative viscosity of 3.6, determined at 20° C. with a solution of 1 g. of substance in 100 milliliters of concentrated sulfuric acid.

What is claimed is:

1. In a process for the manufacture of polyamides of high molecular weight from $\beta$-lactams by anionic polymerization in a two-phase system consisting of a $\beta$-lactam solution and a diluent in the presence of an anionic catalyst and co-catalyst the improvement of dissolving a $\beta$-lactam selected from the group consisting of azetidinone-2, 4-methyl-azetidinone-2, 4-ethyl-azetidinone-2, 4-vinyl-azetidinone-2, and cis- and trans-3,4-dimethyl-azetidinone-2 in a halogenated aromatic compound selected from the group consisting of chlorobenzene, bromobenzene, o-dichlorobenzene, 2-, 3-, and 4-chlorotoluene, the proportion by weight of $\beta$-lactam to solvent being in the range of from 1:10 to 1:1, diluting the $\beta$-lactam solution with heavy gasoline to obtain a two-phase system such that the $\beta$-lactam is maintained in its solution, and polymerizing the $\beta$-lactam in the obtained two-phase system at a temperature in the range of from $-20$ to $+50°$ C.

2. In a process for the manufacture of polyamides of high molecular weight from $\beta$-lactams by anionic polymerization in a two-phase system consisting of a $\beta$-lactam solution and a diluent in the presence of an anionic catalyst and co-catalyst the improvement of dissolving a mixture of $\beta$-lactams selected from the group consisting of azetidinone-2, 4-methyl-azetidinone-2, 4-ethyl-azetidinone-2, 4-vinyl-azetidinone-2, and cis- and trans-3,4-dimethyl-azetidinone-2 in a halogenated aromatic compound selected from the group consisting of chlorobenzene, bromobenzene, o-dichlorobenzene, 2-, 3-, and 4-chlorotoluene, the proportion by weight of $\beta$-lactam mixture to solvent being in the range of from 1:5 to 1:2, diluting the $\beta$-lactam solution with heavy gasoline to obtain a two-phase system, such that the $\beta$-lactam is maintained in its solution, and polymerizing the $\beta$-lactam in the obtained two-phase system at a temperature in the range of from $-20$ to $+50°$ C.

References Cited

UNITED STATES PATENTS 3,093,618   6/1963   Graf et al. _____ 260—78
3,342,783   9/1967   Schlack et al. _____ 260—78

HAROLD D. ANDERSON, Primary Examiner

U.S. Cl. X.R.

260—95